(12) United States Patent
Andersen et al.

(10) Patent No.: US 8,240,207 B2
(45) Date of Patent: Aug. 14, 2012

(54) FIBER OPTIC PARTICLE MOTION SENSOR AND MEASURING METHOD USING THE SENSOR

(75) Inventors: James K. Andersen, Westlake Village, CA (US); Eric Lee Goldner, Chatsworth, CA (US); Leo Lam, Chatsworth, CA (US); William Morey, Chatsworth, CA (US); Ira Jeffrey Bush, Chatsworth, CA (US); Gerald Baker, West Hills, CA (US); Agop Cherbettchian, Santa Monica, CA (US)

(73) Assignee: US Seismic Systems, Inc., Chatsworth, CA (US)

( * ) Notice: Subject to any disclaimer, the term of this patent is extended or adjusted under 35 U.S.C. 154(b) by 0 days.

(21) Appl. No.: 13/190,516

(22) Filed: Jul. 26, 2011

(65) Prior Publication Data
US 2011/0277548 A1 Nov. 17, 2011

Related U.S. Application Data

(62) Division of application No. 12/253,161, filed on Oct. 16, 2008, now Pat. No. 7,999,946.

(60) Provisional application No. 60/999,246, filed on Oct. 16, 2007.

(51) Int. Cl.
*G01P 15/093* (2006.01)
*G01B 9/02* (2006.01)

(52) U.S. Cl. ................ 73/514.27; 356/477; 356/480

(58) Field of Classification Search ................ None
See application file for complete search history.

(56) References Cited

U.S. PATENT DOCUMENTS

| | | | |
|---|---|---|---|
| 5,011,262 A | 4/1991 | Layton | |
| 5,227,857 A | 7/1993 | Kersey | |
| 5,397,891 A | 3/1995 | Udd et al. | |
| 5,680,489 A | 10/1997 | Kersey | |
| 5,986,749 A | 11/1999 | Wu et al. | |
| 6,104,492 A | 8/2000 | Giles et al. | |
| 6,281,976 B1 * | 8/2001 | Taylor et al. | 356/480 |
| 6,381,048 B1 | 4/2002 | Chraplyvy et al. | |
| 6,819,812 B2 | 11/2004 | Kochergin et al. | |
| 2003/0145654 A1 * | 8/2003 | Knudsen et al. | 73/488 |
| 2005/0097955 A1 * | 5/2005 | Berg et al. | 73/504.12 |

* cited by examiner

*Primary Examiner* — Hezron E Williams
*Assistant Examiner* — Gregory J Redmann
(74) *Attorney, Agent, or Firm* — Stradley Ronon Stevens & Young, LLP (57) ABSTRACT

An optical sensor in which acceleration, acoustic velocity, or displacement (vibration) causes a corresponding shift in the center wavelength of the sensor output. The sensor can be coupled to a high-speed interferometric interrogator through an unbalanced fiber interferometer. The unbalanced interferometer functions to translate optical wavelength shift into phase shift, which is easily demodulated by the interrogator. A method of measuring acceleration uses the sensor.

12 Claims, 8 Drawing Sheets

FIBER OPTIC PARTICLE MOTION SENSOR AND MEASURING METHOD USING THE SENSOR

CROSS-REFERENCE TO RELATED APPLICATIONS

This application is a divisional of U.S. application Ser. No. 12/253,161, filed on Oct. 16, 2008 and now issued as U.S. Pat. No. 7,999,946, which claims priority of provisional Application No. 60/999,246 filed on Oct. 16, 2007.

FIELD OF THE INVENTION

The invention relates generally to sensors and methods for acquiring acceleration and/or velocity data using fiber optics. Specifically, the invention relates to grating sensors with ultra narrow band gratings, combined with interferometric wavelength-to-phase conversion and low noise interferometric interrogation.

BACKGROUND OF THE INVENTION

There are many applications that require a device to measure the dynamic acceleration or acoustic velocity signal at a given location. Examples include: the seismic exploration/monitoring of oilfields, seismic monitoring for earthquakes, structural integrity monitoring, and health monitoring of vibrating equipment/machinery acoustic monitoring in marine environments (e.g., SONAR). For decades, such monitoring has been almost exclusively performed using electronic-based sensors such as piezoelectric sensors and magnet/coil sensors. These sensors typically generate a voltage output that is proportional to the intensity of the applied vibratory motion (displacement, velocity or acceleration). Because the generated voltage levels are relatively weak (i.e., low level), electronics are required for amplification, signal conditioning, filtering, and in most cases digitization/multiplexing. These electronics must be located very close to the sensor to limit the introduction of noise into the system. Thus, the electronics must be designed to operate in the local environment (temperature/vibration/humidity/shock) where the sensor is placed.

Recently, the use of fiber optic sensors has become more prevalent for sensing applications, particularly in those applications where the sensors must be placed in harsh environments, which seriously affects the performance/reliability of the associated electronics. Fiber optic sensors have an advantage in that they require no electronics at or near the sensor. In fiber optic sensors, light is sent through the optical fiber from a remote location (in a benign environment). The measurand causes a change in the optical transmissive property of the fiber which is then detected as a change in the received light signal at the remote electronics.

Fiber optic sensors generally fall into two categories, those designed for making high speed dynamic measurements, and those designed for low speed, relatively static measurements. Examples of dynamic sensors include hydrophones, geophones, and acoustic velocity sensors, where the signal varies at a rate of 1 Hz and above. Examples of low speed (static) sensors include temperature, hydrostatic pressure, and structural strain, where the rate of signal change may be on the order of minutes or hours. This invention relates primarily to dynamic measurements of acceleration, acoustic velocity, and vibration using fiber optic sensors. Historically, such sensors have been more costly than the legacy electronic versions because they are difficult to manufacture, require complicated and expensive equipment for even limited automated assembly, and involve significant amounts of skilled touch labor to produce. Although fiber Bragg grating (FBG) accelerometers are currently available, they incorporate spectroscopic interrogation, which limits the sensitivity to about 1 mg. However, many applications require sensitivities on the order of 30-50 ng. Fiber laser devices have also been used for sensing. However, they are expensive and tend to be unstable. The invention endeavors to solve these problems and more to provide extremely high sensitivity acceleration measurements suitable for a wide range of applications requiring sensors in environments in which electronics often cannot survive.

SUMMARY OF INVENTION

To solve these and other problems, and in view of its purposes, the present invention provides fiber optic sensors with a level of performance several orders of magnitude higher than is otherwise achievable using prior technologies. The FBG sensor is packaged as a "particle motion sensor," such that acceleration, acoustic velocity, or displacement (vibration) cause a corresponding shift in the center wavelength of the FBG reflection (or transmission) spectrum. The sensor can be coupled to a high-speed interferometric interrogator through an unbalanced fiber interferometer. The unbalanced interferometer functions to translate the FBG wavelength shift into a phase shift, which is easily demodulated by the interrogator, i.e., the wavelength shift of an FBG sensor is detected by utilizing the inherent wavelength dependence of an unbalanced fiber interferometer.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
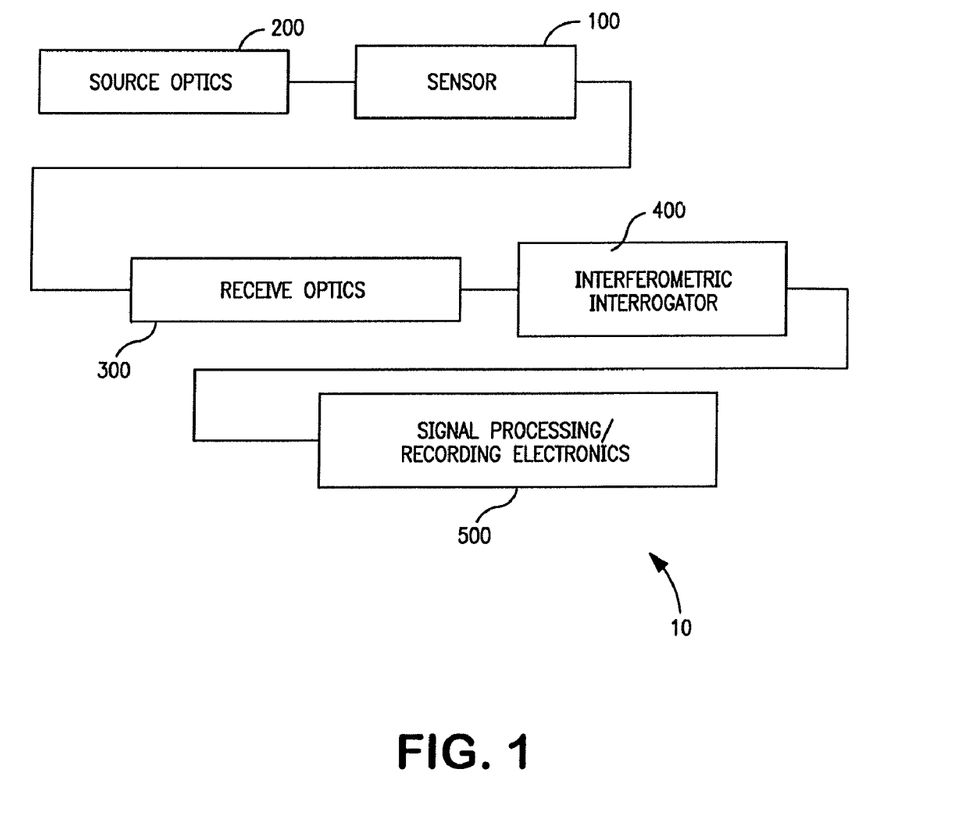
FIG. 1 is a block diagram of a particle motion sensing system in accordance with an embodiment of the invention.

A particle motion sensing system 10 according to one embodiment of the present invention is shown in FIG. 1. The particle motion sensing system 10 includes a transducer or sensor 100, source optics 200, receive optics 300, an interferometric interrogator 400 and signal processing/recording electronics 500.

Figure 2A:
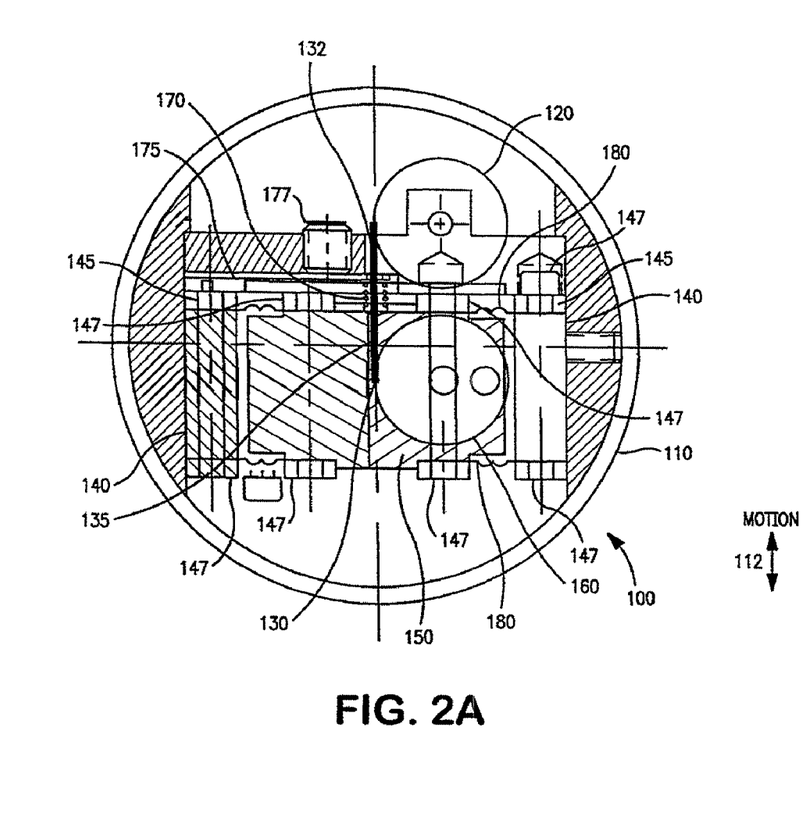
FIG. 2A is a cross-sectional view of a sensor suitable for use in the system of FIG. 1.

Although a number of different configurations of the sensor 100 may be employed, FIG. 2A shows an exemplary embodiment for use with narrow band gratings. Sensor 100 includes a housing 110, an optical fiber 130, a proof mass 150, and a pretension spring 170. The optical fiber 130 has a free region 132 in which a grating 135 is inscribed. The optical fiber 130 is attached at one end to the housing 110 by means of a first anchor 120 and at the other end to the proof mass 150 by means of a second anchor 160. The optical fiber 130 may be attached to the first anchor 120 and the second anchor 160 by bonding or any other suitable method for preventing the optical fiber 130 from slipping relative to either the first anchor 120 or the second anchor 160. Both the first anchor 120 and/or the second anchor 160 may be round spool-shaped structures forming a capstan to help secure the optical fiber 130 to it with the friction therebetween caused by wrapping the optical fiber 130 around the outer diameter of the first anchor 120 or second anchor 160. The proof mass 150 is suspended from the housing 110 by means of a suspension member 180, a clamping ring 140, standoffs 145, and screws 147.

Motion of the sensor 100 is identical to motion of the housing 110. Motion of the sensor 100 along a direction 112 results in motion of the housing 110 relative to the proof mass 150. Relative motion between the housing 110 and the proof mass 150 is constrained to occur only in the direction 112 by the suspension member 180. Relative motion between the housing 110 and the proof mass 150 along direction 112 is controlled by the optical fiber 130 and the pretension spring 170. Pretension spring 170 controls the quiescent tension on the optical fiber 130 in conjunction with the mass of the proof mass 150. The force applied between the housing 110 and the proof mass 150 by the pretension spring 170 is controlled by a flexible cantilever 175 and an adjustment screw 177. The flexible cantilever 175 is permanently attached at one end to the housing 110.

Figure 2B:
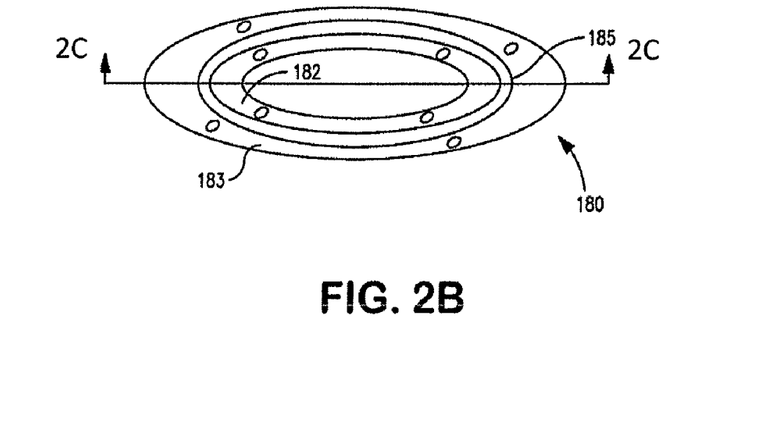
FIGS. 2B and 2C show details of the circular hinge, with FIG. 2C illustrating a cross-section taken along the line 2C-2C of FIG. 2B.
Figure 2C:
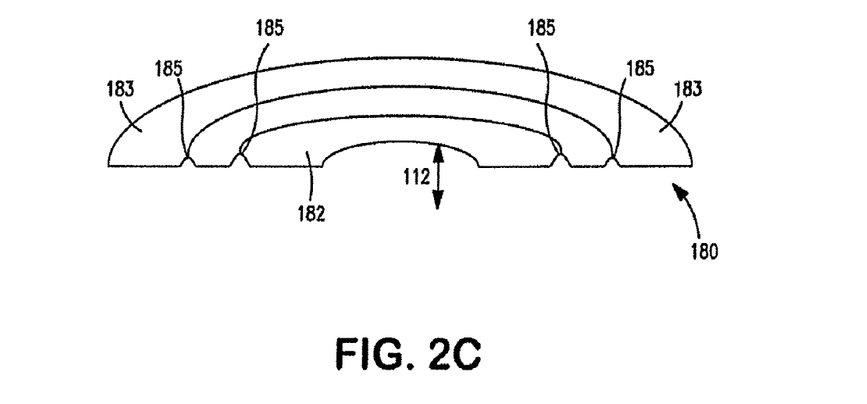

Referring to FIGS. 2B and 2C, the suspension member 180 comprises one or more flexible circular membranes or diaphragms fabricated by stamping or forming a flat stock of ductile metal to form a series of concentric waves 185. These waves 185 allow the central region 182 of suspension member 180 to move with little resistance along direction 112 relative to outer portion 183 of suspension member 180 while ensuring central portion 182 and outer portion 183 of suspension member 180 remain parallel when the proof mass 150 is sandwiched between a pair of suspension members 180. Thus, for small amplitude motions, motion of the proof mass 150 is allowed along direction 112, but resisted in all other directions, including rotational motions.

Figure 3A:
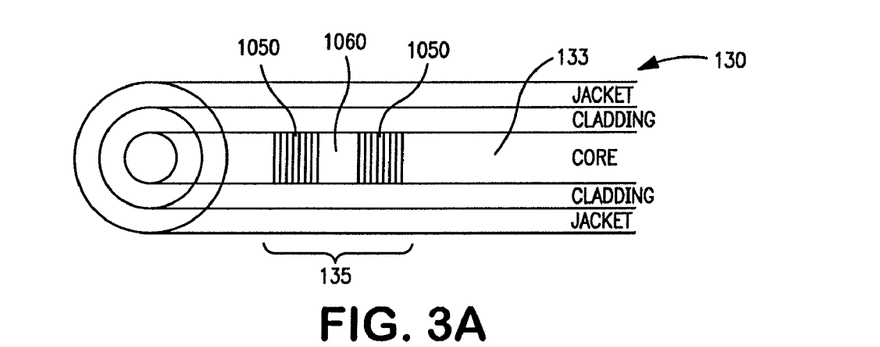
FIGS. 3A and 3B show two embodiments of the narrow linewidth grating.
Figure 3B:
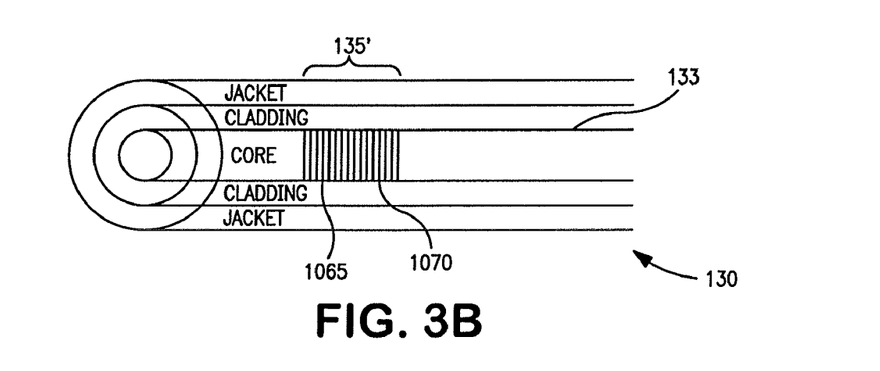
Figure 4:
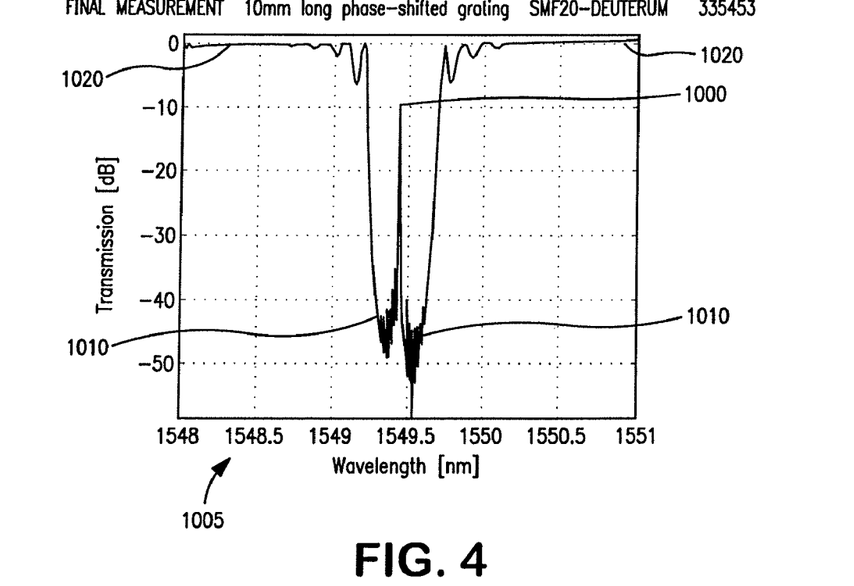
FIG. 4 is a transmission spectrum of a phase shifted grating.

Referring to FIG. 3A, the grating 135 is created by fabricating two FBGs 1050, each of which is a periodic change of the refractive index of the glass core 133 of the optical fiber 130, by means of a laser, a phase mask, an interferometer or other methods well known to practitioners in the art. The two FBGs are separated by a small space 1060 on the order of 100 microns. Alternatively, as shown in FIG. 3B, the grating 135' can be fabricated as a single grating comprising two halves 1065 and 1070 which are shifted in phase relative to one another, for example by it radians. The resulting phase-shifted grating has a typical transmission spectrum 1005 shown in FIG. 4. The significant features of the transmission spectrum 1005 are a central peak 1000, two stop bands 1010 and two pass bands 1020. Typical values for the spectrum 1005 are a peak transmission width of 0.4 pm, a stop band 1010 depth of >40 dB, stop band 1010 width of about 800 pm and near 100% transmission in the pass bands 1020.

Relative motion between the housing 110 and the proof mass 150 changes the longitudinal strain within the free region 132 of optical fiber 130 between the first anchor 120 and the second anchor 160. Changes in the longitudinal strain within the optical fiber 130 cause a proportional shift of the peak wavelength of the reflection or transmission spectrum of the grating 135.

Figure 5:
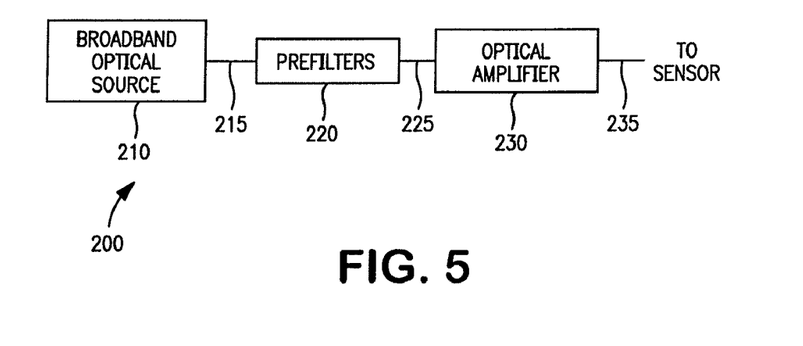
FIG. 5 is a block diagram of the source optics.

Referring to FIG. 5, the source optics 200 include a broadband optical source 210, prefilters 220 and an optical amplifier 230. In the exemplary embodiment of the invention, the broadband optical source 210 is a Superluminescent Light Emitting Diode (SLED). However, any suitable optical source with a bandwidth of at least approximately 1 nm may be used, such as an Amplified Spontaneous Emission (ASE) source, Light Emitting Diode (LED), etc. The source should provide an intensity of at least 0.4 mW/nm into an optical fiber and have a spectral output at least 1 nm wide. The output of the broadband optical source 210 is connected to the input of the prefilters 220 through an optical fiber 215. The prefilters 220 may comprise one or more band pass optical filters, each of which has a passband of about 1 nm. Examples of such a filter are a Dense Wavelength Division Multiplexer (DWDM) or an Optical Add Drop Multiplexer (OADM), both of which are well known to those practiced in the art of telecommunication and sensing optics. The output of the prefilters 220 is connected to the input of the optical amplifier 230 through optical fiber 225. The optical amplifier 230 can be any suitable means for providing optical gain. Examples of appropriate optical amplifiers are Erbium-Doped Fiber Amplifiers (EDFAs) and Semiconductor Optical Amplifiers (SOAs), both of which are well known to those practiced in the art of telecommunication and sensing optics. The output of the optical amplifier 230 is connected to the input of the sensor 100 through an optical fiber 235.

Figure 6:
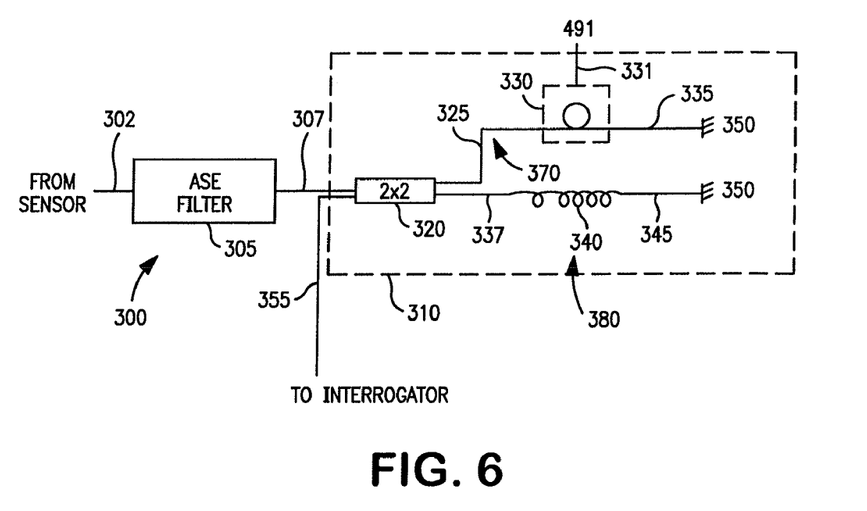
FIG. 6 is a schematic of the receive optics.

Referring to FIG. 6, the receive optics 300 include an Amplified Spontaneous Emission (ASE) filter 305 and a mismatched path interferometer 310. The output of the sensor 100 is connected to the input of the ASE filter 305 through an optical fiber 302. The ASE filter 305 is a bandpass filter used to minimize the intensity of amplified spontaneous emission from the optical amplifier 230 that is outside the stop band 1010 of the grating 135. The ASE filter 305 preferably has a very narrow transmission passband. An example of an appropriate ASE filter 305 is a 50 GHz OADM.

Figure 7:
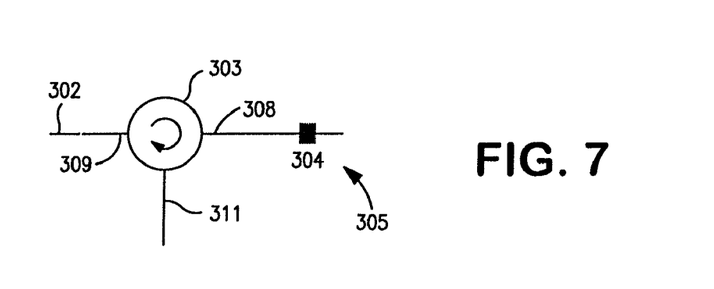
FIG. 7 is a diagram of an embodiment of the ASE filter.

Details of ASE filter 305 are shown in FIG. 7. ASE filter 305 includes an optical circulator 303 and an FBG 304. The optical circulator 303 is a passive optical device well known within the field of telecommunications that passes light from a first port 309 to second port 308, but not vice versa. It also passes light from second port 308 to third port 311, but not vice versa. It also does not pass light from third port 311 to first port 309. In other words, light can only circulate in and out of the circulator 303 in one direction. Connected to output power of the circulator 303 is the FBG 304. The FBG 304 has a high peak reflectivity (>80%) and a full width half maximum bandwidth of about 300 pm. Such devices are well known to those who practice in the art. The distal lead of FBG 304 remains unconnected.

Referring again to FIG. 6, the mismatched path interferometer 310 includes a 2×2 optical coupler 320, a phase modulator 330, an optical delay line 340 and two mirrors 350. The input leg 307 of the 2×2 optical coupler 320 is connected to the output of the ASE filter 305. The 2×2 optical coupler 320 divides the input light with half going to each of its output leads 325 and 337. One output lead 325 is connected to the phase modulator 330, which is connected to mirror 350 through optical fiber 335. The phase modulator 330 is used to impose a known phase to the light traveling within a leg 370 of the mismatched path interferometer 310. The other output lead 337 of the 2×2 optical coupler 320 is connected to the optical delay line 340, which is connected to mirror 350 through optical fiber 345. The physical length difference between the leg 370 and a leg 380 of the mismatched path interferometer 310 is non-zero, and is preferably in the range of approximately 1-5 meters.

The mismatched pathlength interferometer 310 converts the changing peak wavelength in the central peak 1000 of the light transmitted from the sensor 100 into a change in phase angle of the light traversing the two legs 370 and 380. The conversion of the peak wavelength to phase is on the order of 2 rad/pm, and increases with larger differences in length between the two legs 370 and 380.

After the light passes through the mismatched pathlength interferometer 310, it travels by means of output fiber 355 to the interferometric interrogator 400. The function of the interferometric interrogator 400 is to measure the change in the phase angle difference between the two legs 370 and 380 of the mismatched pathlength interferometer 310 over time. A number of approaches have been used for interferometric interrogation, such as heterodyne demodulation and homodyne demodulation. For example, the Optiphase OPD-4000 is a suitable demodulator. It applies a sinusoidal modulation waveform to the phase modulator 330. An example frequency for the modulation waveform is 20 kHz, well above the planned maximum operational frequency of the system— about 150 Hz. The resultant modulated optical waveform that arrives at the interferometric demodulator 400 is converted to an electrical signal, digitized and downconverted within the interferometric demodulator 400.

Figure 8:
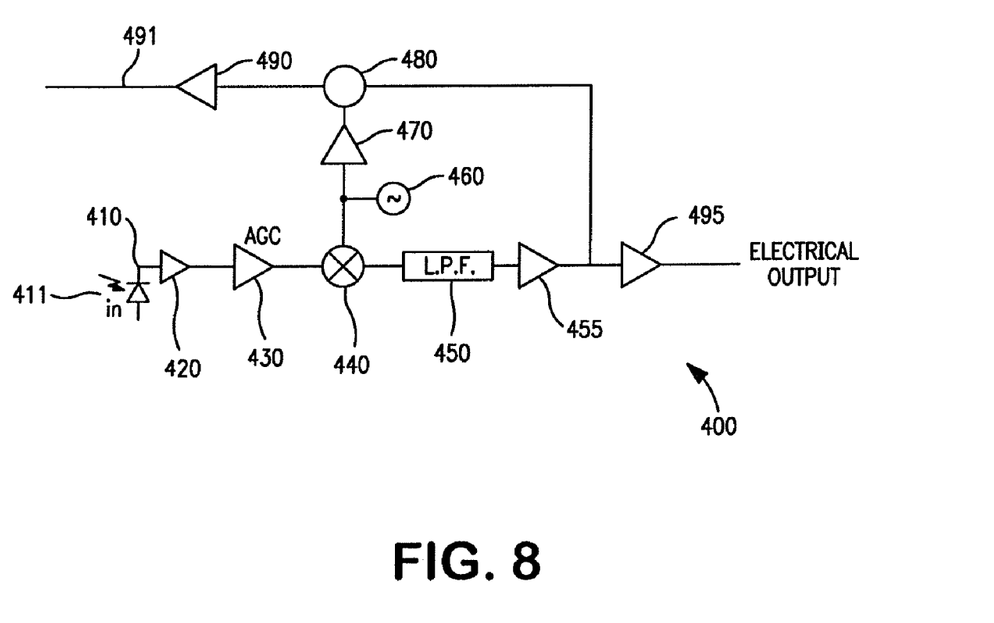
FIG. 8 is a block diagram of a closed loop interferometric interrogator.

FIG. 8 illustrates a low noise method of measuring the phase angle difference between the two legs 370 and 380 of the mismatched pathlength interferometer 310 over time using a closed loop interferometric interrogator 400. A stable, low noise local oscillator 460 provides a modulation waveform such as a sine wave. A bias amplifier 470 adjusts the amplitude of the output of the local oscillator 460 to be applied to the phase modulator 330. Ideally, a π/2 radian phase shift is applied to the phase modulator 330 to ensure that the mismatched pathlength interferometer 310 operates within a roughly linear range of its transfer function.

The interference signal from the mismatched pathlength interferometer 310 travels along optical fiber 411 and illuminates photodetector 410. The purpose of photodetector 410 is to convert light into an electrical current. A number of suitable devices are available for photodetector 410. The exemplary embodiment utilizes an ETX-100, manufactured by JDS Uniphase. The electrical output of the photodetector 410 is connected to a very low noise, high gain preamplifier 420. The output of the preamplifier 420 is connected to an Automatic Gain Control (AGC) 430. The AGC 430 enables continuous correction for changes in optical intensity levels throughout the system. The output of AGC 430 is mixed with the signal from the local oscillator 460 within an analog multiplier 440. The purpose of the analog multiplier 440 is to provide a pair of signals equal to the sum and difference of the AGC 430 output and local oscillator 460. The output of the analog multiplier 440 is connected to the input of a low pass filter 450. For a 150 Hz maximum frequency range system, the cutoff frequency of the low pass filter 450 would be around 500 Hz. The cutoff frequency of the low pass filter is well below the sum frequency of the output of the analog multiplier 440. This ensures only the low frequency difference signal from the analog multiplier 440 is passed. The combination of local oscillator 460, analog multiplier 440 and low pass filter 450 functions as a synchronous detector. The output signal from the low pass filter 450 is passed along to a high gain amplifier 455. The output of the high gain amplifier 455 is connected to the input of the variable gain output driver amplifier 495 which provides a voltage output proportional to the phase angle difference between the two legs 370 and 380 of the mismatched pathlength interferometer 310 over time. The output voltage of the amplifier 495 is also proportional to the amplitude of the acceleration experienced by the sensor 100.

The output of the bias amplifier 470 is added to the output of the high gain amplifier 455 in a summing amplifier 480. The output of the summing amplifier is connected to the input of a modulator driver amplifier 490. The output 491 of the modulator driver amplifier 490 is applied to electrical input 331 of the phase modulator 330 within the mismatched pathlength interferometer 310 (FIG. 6).

The negative overall loop gain of the interferometric interrogator 400 acts to provide negative feedback to the phase modulator 330 which is equal and opposite to the optical phase angle difference between the two legs 370 and 380 of the mismatched pathlength interferometer 310. This nulling action serves to maintain operation of the mismatched pathlength interferometer 310 within the linear range of its transfer function.

The operation of the particle motion sensing system 10 is therefore governed by the following scale factor equation:

$$SF_{system} = SF_{sensor} * SF_{FBG} * SF_{interferometer}$$

Where the overall system scale factor $SF_{system}$ is the product of the sensor scale factor $SF_{sensor}$, typically 1,000 microstrain/g, the FBG scale factor SFfbg, typically 1.2 pm/microstrain, and the interferometer scale factor $SF_{interferometer}$, typically about 3 Rad/pm. These typical values result in an overall system scale factor of 2,988 rad/g (69.5 dB:Rad/g). The dominant noise source in these types of systems is the Relative Intensity Noise (RIN) caused by the extreme filtering of the broadband optical source 210 by the FBG 135. This results in a phase noise floor of about −80 dB:rad/√Hz. Therefore, the resulting noise floor would be −80 dB-69.5 dB=−149.5 dB:g/√Hz. For normalized detection within a 1 Hz bandwidth, this provides a minimum detectable acceleration of −149.5 dB:g or about 33 ng, which is typical performance for electronic, moving coil-type geophones, but about 10,000 times better resolution than FBG accelerometers that employ typical, or spectroscopic-type interrogation.

Practical systems frequently require a number of sensors to be combined and processed with a single set of electronics. Mutiplexing multiple sensors is easily accomplished with interferometric FBG acceleration sensing. One such embodiment is a hybrid Wavelength Division Multiplexing (WDM)/ Time Division Multiplexing (TDM) multiplexed system such as that shown in FIG. 9, which is simplified for a four sensor system. It will be recognized that the same principles apply to larger arrays of sensors.

Figure 9:
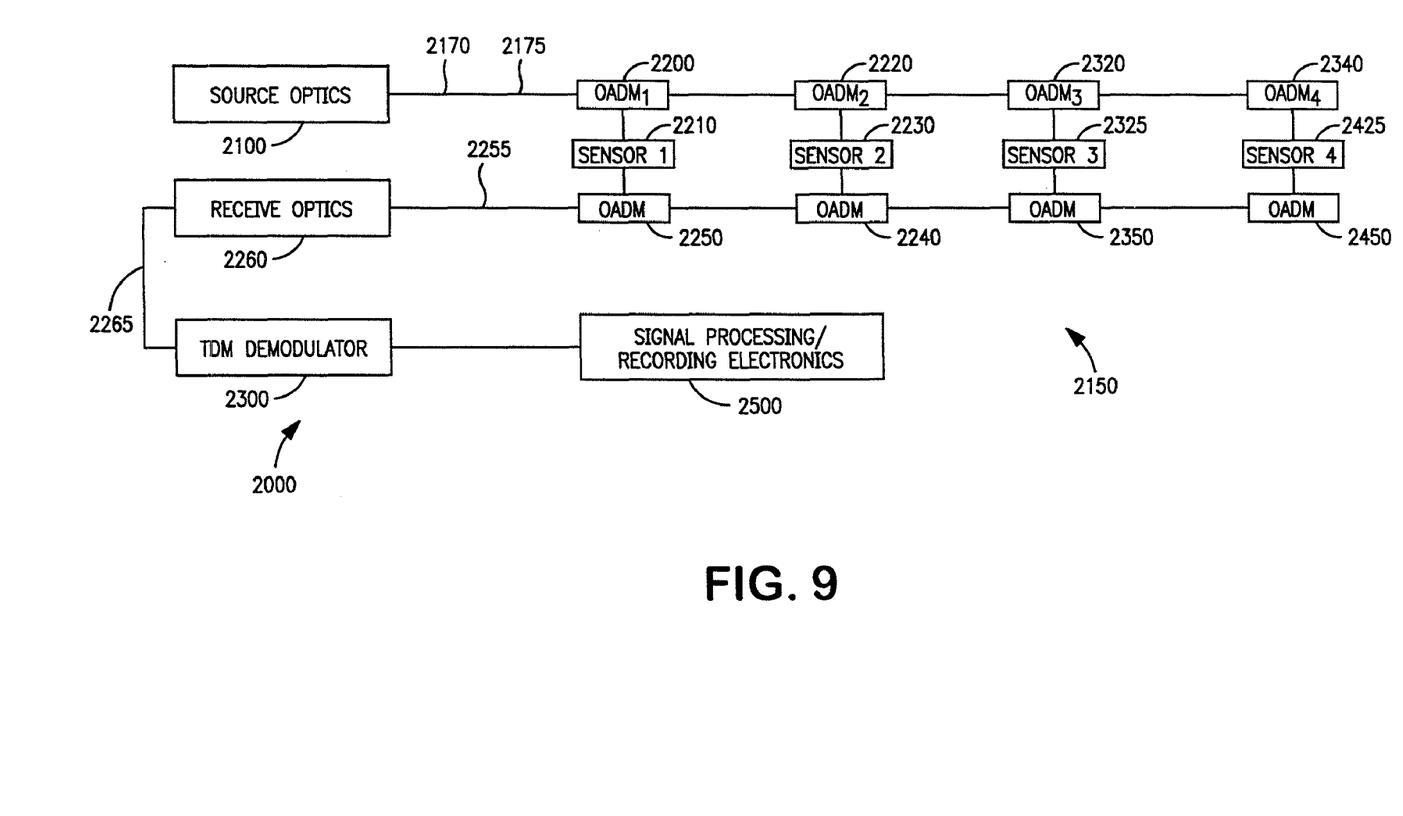
FIG. 9 is a block diagram of a WDM/TDM multiplexed system.
Figure 10:
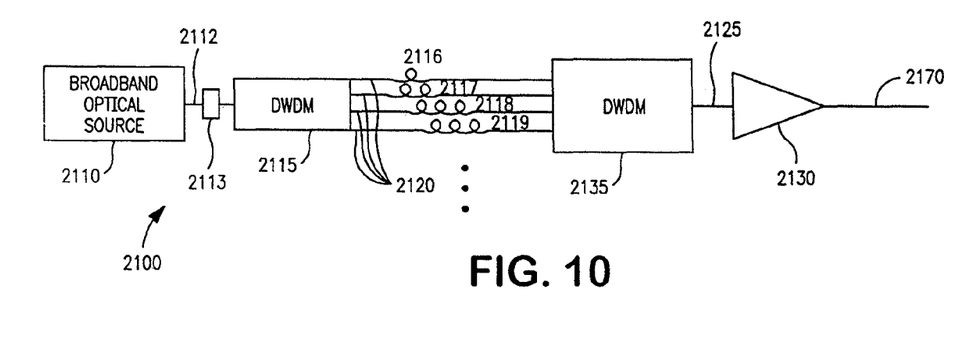
FIG. 10 is a block diagram of the source optics of a WDM/TDM multiplexed system.

An embodiment of a WDM/TDM multiplexed system 2000 is shown in FIG. 9. This system includes source optics 2100, which is shown in greater detail in FIG. 10. The output of a broadband optical source 2110 is connected to the input of an optical switch 2113 via an optical fiber 2112. Semiconductor Optical Amplifiers (SOAs) are typical devices suitable for high extinction ratio optical switching. Suitable devices are manufactured by companies such as Inphenix and Kamelian. The optical switch 2113 creates a series of pulses needed for interrogation. Dense Wavelength Division Multiplexer (DWDM) 2115 divides the light along multiple fibers 2120, each with a different central wavelength, typically separated by about 0.8 nm. Along each of the fibers 2120 is added a different fiber optic delay line 2116, 2117, 2118, and 2119, typically 50 to 100 m. The four different wavelengths of light travelling through the delay lines 2116 through 2119 are passed through a second DWDM 2135, which recombines all four wavelengths and outputs them together along optical fiber 2125 to an optical amplifier 2130. The output of the optical amplifier 2130 passes through optical fiber 2170.

Referring back to FIG. 9, the output of the source optics 2100 passes through optical fiber 2170 to the sensor array 2150. The sensor array 2150 consists of a series of sensors and filters in a ladder configuration with one downlink optical fiber and one uplink optical fiber. Light travelling from optical fiber 2170 continues along downlink optical fiber 2175 to OADM 2200. OADM 2200 acts to filter out a narrow (on the order of 1 nm wide) wavelength band of light for the first sensor and passes the remainder of the light for the remaining sensors. The "drop" leg of OADM 2200 is connected to the input of a sensor 2210. The output of sensor 2210 is connected to the "add" leg of OADM 2250. The "pass" leg of OADM 2250 is connected to the uplink fiber 2255. The light from the sensor 2210 thus passes along the uplink optical fiber 2255 to the receive optics 2260.

The light from the "pass" leg of OADM 2200 is connected to the input of OADM 2220. OADMs 2200, 2220, 2320 and 2340 have different add wavelengths. OADMs 2200, 2220, 2320 and 2340 have different pass wavelengths. The "drop" leg of OADM 2220 is connected to a sensor 2230. The output of sensor 2230 is connected to the "add" leg of OADM 2240. The "pass" leg of OADM 2240 is connected to the input leg of OADM 2250. The "pass" leg of OADM 2220 is connected to the input leg of OADM 2320. The "drop" leg of OADM 2320 is connected to the input of a sensor 2325. The output of sensor 2325 is connected to the "add" leg of OADM 2350. The "pass" leg of OADM 2350 is connected to the input leg of OADM 2240. The "pass" leg of OADM 2320 is connected to the input leg of OADM 2340. The "drop" leg of OADM 2340 is connected to the input of sensor 2425. The output of sensor 2425 is connected to the "add" leg of OADM 2450. The "pass" leg of OADM 2450 is connected to the input leg of OADM 2350. The "pass" leg of OADM 2340 and the input leg of OADM 2450 remain unconnected.

Figure 11:
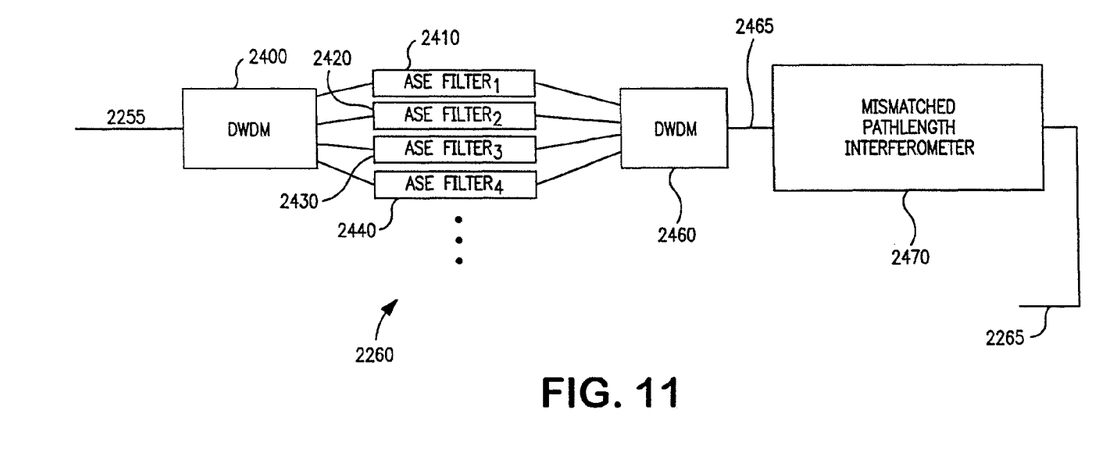
FIG. 11 is a block diagram of the receive optics of a WDM/TDM multiplexed system.

Referring to FIG. 11, the uplink optical fiber 2255 is connected to the input of DWDM 2400. DWDM 2400 divides the light into four bands, one for each of the sensors 2210, 2230, 2325 and 2425. Each output leg of the DWDM 2400 is connected to a respective one of four ASE filters 2410, 2420, 2430 and 2440. The ASE filters are identical to ASE filter 305. The outputs of the ASE filters 2410, 2420, 2430 and 2440 are connected to the four inputs of DWDM 2460, which recom-bines the wavelengths onto a single fiber 2465. Fiber 2465 is connected to the mismatched pathlength interferometer 2470. The output of the mismatched pathlength interferometer 2470 is connected to a fiber 2265.

Referring again to FIG. 9, fiber 2265 is connected to TDM demodulator 2300. A number of different TDM demodulators are available, such as the ERS-5100 manufactured by Optiphase, Inc., Van Nuys, Calif. The TDM demodulator 2300 controls the optical switch 2113, which provides light pulses to each of the sensors 2210, 2230, 2325 and 2425 that are separated in time such that each sensor can be interrogated separately by the same TDM demodulator 2300. The TDM demodulator 2300 also controls the amplitude and phase of the phase modulator within the mismatched pathlength interferometer 2470, which is identical to the mismatched pathlength interferometer 310 used for a single sensor 100. The output of the TDM demodulator 2300 is a digital representation of the output of each of the sensors 2210, 2230, 2325 and 2425 and is input to the signal processing/recording electronics 2500 for further filtering, averaging, storage and display.

In general, it will be recognized that the above-described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A sensor comprising:
   a housing;
   a mass moveably disposed within the housing;
   a first anchor attached to the housing;
   a second anchor attached to the mass;
   at least one suspension member interposed between the mass and the housing that allows the mass to move freely along one axis while restricting motions of the mass along all other axes, wherein the at least one suspension member includes at least one circular diaphragm and the at least one circular diaphragm contains at least one concentric ridge;
   a section of an optical fiber attached at one end thereof to the first anchor and attached at the other end thereof to the second anchor, the section of optical fiber having a grating inscribed therein, the section of optical fiber serving both as a restoring spring and to sense relative motion between the mass and the housing;
   an additional spring between the mass and the housing for imposing a fixed tension upon the fiber to enable measurements of motion of the sensor in any orientation; and
   means for adjusting the spring to control the fixed tension imposed upon the fiber.

2. The sensor of claim 1 wherein the first anchor comprises a capstan.

3. The sensor of claim 1 wherein the second anchor comprises a capstan.

4. The sensor of claim 1 wherein the grating comprises a Bragg grating.

5. The sensor of claim 1 wherein the grating comprises a phase shifted grating.

6. The sensor of claim 1 wherein the grating comprises a pair of gratings comprising a Fabry-Perot interferometer.

7. The sensor of claim 1 wherein the grating has a central transmission peak.

8. The sensor of claim 1 wherein the grating has a transmission peak with a spectral width of approximately 0.3 picometers.

9. The sensor of claim 1 wherein the grating has a stop band of low transmission extending above and below a wavelength of the peak transmission.

10. The sensor of claim 1 wherein the grating has a stop bandwidth of approximately 1 nanometer.

11. The sensor of claim 1 wherein the mass is coupled to the housing by at least one flexible joint that allows free movement along one orthogonal axis and limits movement in the other two orthogonal axes.

12. The sensor of claim 11 wherein the at least one flexible joint comprises a circular diaphragm.

* * * * *